United States Patent
Trachy et al.

(10) Patent No.: US 9,792,178 B2
(45) Date of Patent: Oct. 17, 2017

(54) PROGRESSIVE PARITY

(71) Applicant: Spectra Logic Corporation, Boulder, CO (US)

(72) Inventors: David Lee Trachy, Longmont, CO (US); Joshua Daniel Carter, Lafayette, CO (US)

(73) Assignee: Spectra Logic, Corporation, Boulder, CO (US)

( * ) Notice: Subject to any disclaimer, the term of this patent is extended or adjusted under 35 U.S.C. 154(b) by 44 days.

(21) Appl. No.: 14/605,821

(22) Filed: Jan. 26, 2015

(65) Prior Publication Data
US 2016/0217036 A1    Jul. 28, 2016

(51) Int. Cl.
*G11C 29/00*    (2006.01)
*G06F 11/10*    (2006.01)
*G06F 3/06*    (2006.01)

(52) U.S. Cl.
CPC .......... *G06F 11/1076* (2013.01); *G06F 3/064* (2013.01); *G06F 3/0619* (2013.01); *G06F 3/0683* (2013.01); *G06F 2211/108* (2013.01)

(58) Field of Classification Search
CPC ...... G06F 3/0619; G06F 3/064; G06F 3/0683; G06F 11/1084; G06F 2211/108; G06F 3/0655; G06F 9/321; G06F 3/0608; G06F 3/0613; G06F 3/0638; G06F 3/0686; G06F 1/3221; G06F 1/3268; G06F 11/008; G06F 1/3287; G06F 3/0625; G06F 3/0634; G06F 3/0689
See application file for complete search history.

(56) References Cited

U.S. PATENT DOCUMENTS

| | | | |
|---|---|---|---|
| 6,289,415 B1 | 9/2001 | Johnson | |
| 6,393,516 B2 | 5/2002 | Johnson | |
| 7,350,101 B1* | 3/2008 | Nguyen | G06F 11/1084 711/114 |
| 8,615,322 B2* | 12/2013 | Thompson | G11B 15/6835 414/273 |
| 2002/0087785 A1* | 7/2002 | Milligan | G06F 11/1076 711/112 |
| 2006/0129761 A1* | 6/2006 | Guha | G06F 1/3221 711/114 |
| 2006/0259847 A1 | 11/2006 | Villa | |
| 2008/0141099 A1 | 6/2008 | Katoh et al. | |
| 2009/0055583 A1* | 2/2009 | Kishi | G06F 3/0617 711/111 |
| 2012/0076621 A1* | 3/2012 | Thompson | G11B 15/689 414/267 |

(Continued)

*Primary Examiner* — Guerrier Merant
(74) *Attorney, Agent, or Firm* — Kenneth Altshuler (57) ABSTRACT

A magazine-based data storage library is described that essentially provides a first tape cartridge adapted to retain first data and first metadata, a second tape cartridge adapted to retain second data and second metadata, a random access storage memory, such as a hard disk drive, whereon parity of the first data and the second data along with the first metadata and second metadata is retained. It is not required that the first data and the second data be written in parallel. The parity data on the random access storage memory is transferred to a parity tape, which can be used to reconstruct any data lost from either the first tape cartridge or the second tape cartridge.

15 Claims, 11 Drawing Sheets

(56) References Cited

U.S. PATENT DOCUMENTS

| | | | |
|---|---|---|---|
| 2012/0079192 A1* | 3/2012 | Jaquette | G06F 17/30221 711/114 |
| 2013/0101373 A1* | 4/2013 | Starr | G11B 15/689 414/267 |
| 2013/0326135 A1* | 12/2013 | Carter | G06F 3/0655 711/111 |
| 2014/0019680 A1* | 1/2014 | Jin | G11B 5/012 711/112 |
| 2016/0117133 A1* | 4/2016 | Blaum | G06F 3/0644 711/114 |

* cited by examiner

| Bit | A | B | C | D | P |
|-----|---|---|---|---|---|
| 1 | 1 | 1 | 1 | 0 | 1 |
| 2 | 1 | 0 | 0 | 1 | 0 |
| 3 | 1 | 0 | 0 | 1 | 0 |
| 4 | 0 | 1 | 1 | 0 | 0 |
| 5 | 1 | 1 | 1 | 1 | 0 |
| 6 | 1 | 0 | 0 | 0 | 1 |
| . | . | . | . | . | . |
| . | . | . | . | . | . |
| . | . | . | . | . | . |
| n | 0 | 1 | 1 | 0 | 0 |
| n+1 |  | 0 | 0 | 1 | 1 |
| n+2 |  | 1 | 1 | 0 | 0 |
| n+3 |  | 0 | 0 |  | 0 |
| n+4 |  |  | 0 |  | 0 |
| n+5 |  |  | 1 |  | 1 |

PROGRESSIVE PARITY

CROSS-REFERENCE TO RELATED APPLICATIONS

None.

FIELD OF THE INVENTION

The present embodiments are directed to a method for constructing parity in a data cartridge set.

DESCRIPTION OF RELATED ART

Presently, data cartridge magazine libraries transfer tape cartridges via a data cartridge magazine between a shelf system and a tape drive. If access to a target tape cartridge is required, for reading and/or writing data, the target tape cartridge disposed in a magazine is moved from a shelf system to the target tape drive where the target tape cartridge is loaded therein. Sometimes, a magazine contains a plurality of tape cartridges used for a common set of data related in some way. Sometimes, data is lost if a tape cartridge becomes damaged or for some other reason is no longer able to recall the data originally stored thereon. In this situation, not only is the potential of one tape lost, but the entire data set becomes compromised.

Redundant Array of Independent Tapes (RAIT) provides a parity tape cartridge that is written while a plurality of other tapes comprising a tape set, or group, are written in parallel. In other words, if there is a tape set of four cartridges and one parity tape cartridge, five tape drives are each loaded with one of the tape cartridges from the set and all five tape drives are writing data in to each of the five tape cartridges in parallel.

It is to innovations related to this subject matter that the claimed invention is generally directed.

SUMMARY OF THE INVENTION

The present embodiments generally relate to a cartridge magazine-based library further using random access memory cache as part of an archive storage system with an archive storage controller possessing archive storage, such as one or more hard disk drives for example, to provide redundant data in the form of parity construction when storing data to a tape set to address issues around losing data from one of the tapes in the tape set.

Some embodiments of the present invention contemplate a data storage system comprising: a first removable storage medium comprising first data and first metadata of the first data; a second removable storage medium comprising second data and second metadata of the second data, the second data and the second metadata stored to the second removable storage medium at a different time from when the first data and the first metadata were stored to the first removable storage medium; and a random access memory device comprising parity of the first data and the second data in addition to the first metadata and the second metadata.

Yet other embodiments of the present invention can therefore comprise a method for: providing a data storage system with a data storage medium, a second data storage medium, a parity data storage medium, a first data transfer device, and a dedicated random storage access memory device; loading the first data storage medium into the first data transfer device; storing first data and first metadata corresponding to the first data to the first data storage medium via the first data transfer device; storing the first data to the dedicated random storage access memory device disengaging the first data storage medium from the first data transfer device; loading the second data storage medium into the first data transfer device; storing second data and second metadata corresponding to the second data to the second data storage medium via the first data transfer device; and storing parity data of the first data and the second data to the dedicated random access memory device.

And, yet other embodiments of the present invention contemplate a method for constructing parity in a tape cartridge set, the method comprising: providing a tape library with a plurality of tape cartridges including cartridge-x and cartridge-y, a first tape drive, a second tape drive, and dedicated random access storage capability; loading the cartridge-x into the first tape drive; storing a sequence of x-bits to cartridge-x via the first tape drive; storing a coinciding sequence of the x-bits to the dedicated random storage access storage capability; disengaging the cartridge-x from the first tape drive; disposing the cartridge-x in a holding receptacle; loading the cartridge-y into the second tape drive before disengaging the cartridge-x from the first tape drive; storing a sequence of y-bits to cartridge-y via the second tape drive before the x-bits are finished being stored to the cartridge-x; and overwriting the sequence of the x-bits to the dedicated random storage access storage capability with a parity of the y-bits and the x-bits to the dedicated random access storage capability.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of parity to protect against data loss.

Figure 1:
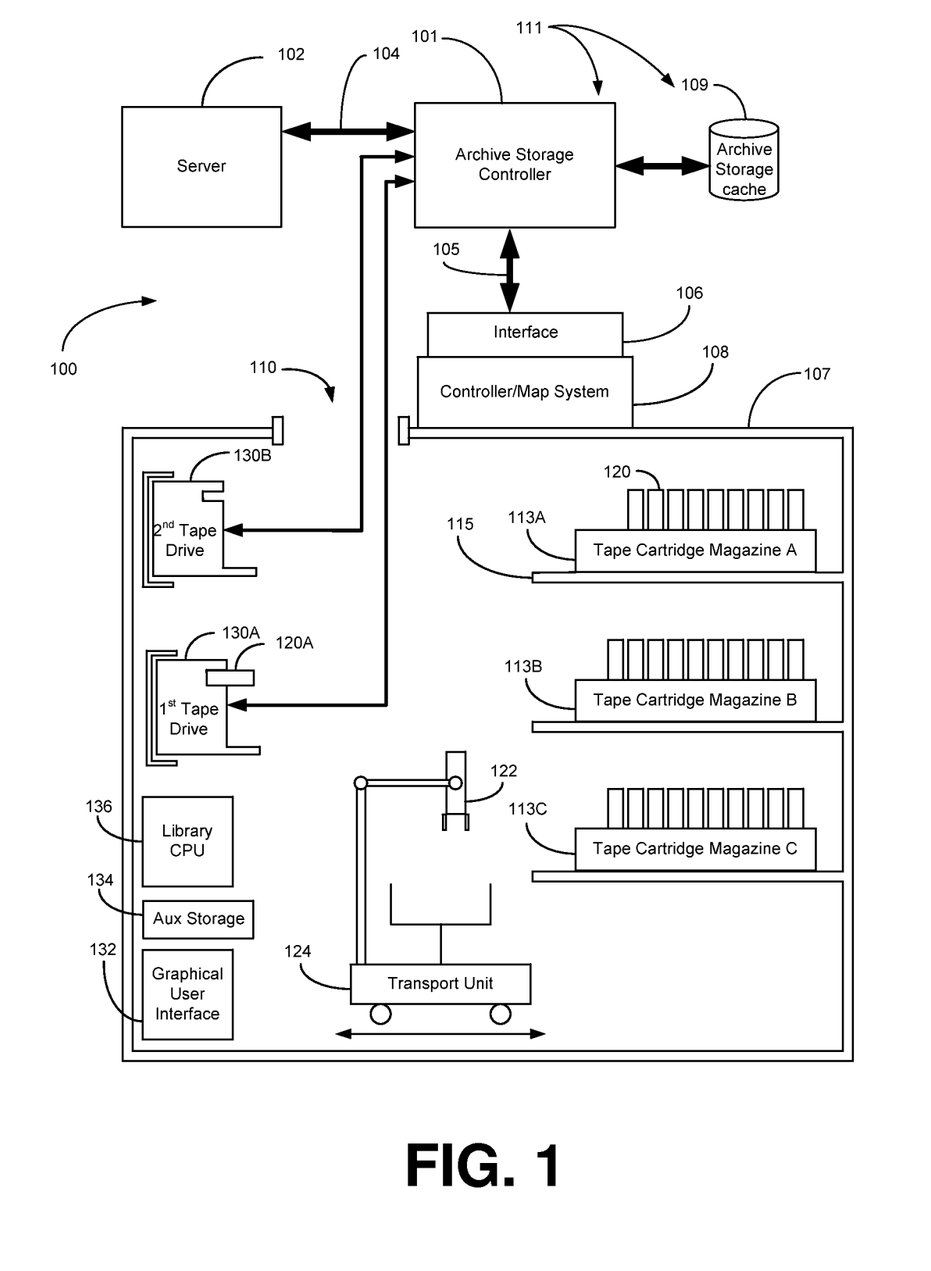
FIG. 1 depicts an embodiment of a data storage arrangement constructed in accordance with various embodiments of the present invention.
Figure 2:
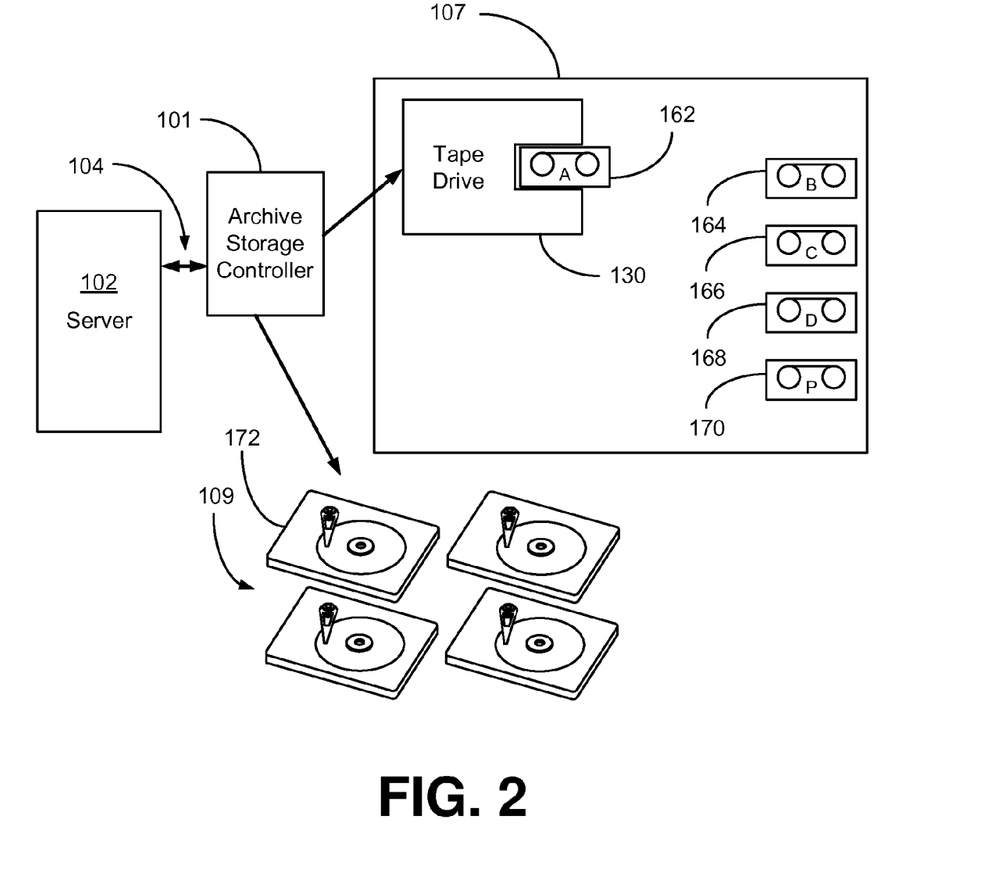
FIG. 2 illustratively depicts a simplified diagram of the tape library constructed in accordance with certain embodiments of the present invention.

With reference to FIGS. 1 and 2, certain exemplary embodiments below essentially describe a first tape cartridge retaining first user data and first metadata, a second tape cartridge retaining second user data and second metadata, a random access storage memory 172, such as one or more hard disk drives 109 that can be comprised by an archive storage controller 101, retaining a parity of the first data and the second data along with the first metadata and second metadata, wherein the parity data on the random access storage memory 172 is transferred to a parity tape 170. Tape cartridges used herein are embodiments of a removable storage medium wherein removable means to freely move around a data storage system, such as a tape library, and out of the storage system. Other embodiments of a removable storage medium include optical disks, optical disk cartridges, magnetic disks, optical-magnetic disks, mobile solid state memory devices, for example. It is contemplated that a removable storage medium cooperates with a data transfer device whereby the data transfer device cooperates with the storage medium to store data to the storage medium and retrieve data from the storage medium. An example of a cooperating relationship between a data transfer device and a removable storage medium is a tape drive adapted to cooperate with a tape cartridge. The parity tape 170 can be used to reconstruct any data lost from either the first tape cartridge or the second tape cartridge. Parity as used here is a mathematical formula based on data bits from two or more sets of data that can be used to reproduce data bits from one (or more) of the data sets that are absent. This is commonly used in RAID (Redundant Array of Independent Disks) and RAIT (Redundant Array of Independent Tapes), for examples. There are a number of different kinds of RAID related architectures including standard RAID levels 1-6, and non-standard having double parity, nested RAID, Bit-Interleaved parity (RAID Level 3), Block-Interleaved parity (RAID Level 4), Block-Interleaved Distributed parity (RAID Level 5), P+Q redundancy (RAID Level 6), striped mirrors (RAID Level 10), and the like, contemplated within the scope and spirit of the present invention.

In more detail, an exemplary environment in which preferred embodiments of the present invention can be practiced, FIG. 1 depicts an embodiment of a data storage arrangement 100 constructed in accordance with various embodiments of the present invention. In what follows, similar or identical structures may be identified using identical callouts.

The data storage arrangement 100 of FIG. 1 can comprise a server 102, such as a client or host or other user of data, in communication with an archive storage system 111 generally possessing an archive controller 101 and archive storage cache 109, such as a plurality of hard disk drives, the archive storage controller 101 being in communication with a data storage library 107. As illustratively shown, the client 102 is in communication with the library 107 archive storage controller 101 via a communication path 104. The archive storage controller 101 is in communication with the storage library 107, such as, via a library interface device 106. One embodiment contemplates the archive storage controller 101 in direct communication with the tape drives 130A and 130B, such as through SCSI commands. The library 107107 comprises a plurality of tape cartridges 120 disposed in a tape cartridge magazine, such as tape cartridge magazine 'A' 113A. Herein, tape cartridge magazine 113 will be used to denote a generic cartridge magazine and tape cartridges 120 will be used to denote a generic cartridge. Each tape cartridge magazine 113 contains a plurality of slots (shown in FIG. 2) wherein each slot is adapted to accommodate a tape cartridge 120. A tape cartridge 120 houses at least one reel and a recording tape, generally magnetic, wound around the reel.

Here, the library 107 may be configured to maintain a map of the slots in each magazine 113. More specifically, each slot in a magazine 113 will have a unique identification, such as an address, that is identifiable by the host computer 102 via a map of logical addresses provided by the library 107, and such as a map system 108, in this example. A tape cartridge 120 disposed in a particular slot may assume the identity of the particular slot for purposes of the mapping system 108. Hence, a tape cartridge 120 disposed in a third slot having an address mapped as slot number three will assume the identity of slot number three. In other words, the tape cartridge will be mapped and identified as "slot number three" in this example. Optionally, a tape cartridge 120 can be simply identified by a serial number, or other indicia (such as a bar code, medium auxiliary memory information, etc.), and be assigned, or mapped, to a slot, by a host computer 102, for example.

The library 107 can further comprise at least one robotic transporter 124, though in optional library embodiments, multiple transporters exist. The robotic transporter 124 comprises a carriage or other transporting means to carry a tape cartridge magazine 113 from the shelf system 115 to a position ready to load a tape cartridge 120 into a tape drive 130A or 130B. Generically, a tape drive is denoted herein as element 130 and is an embodiment of a data transfer device. In the present embodiment, the shelf system 115 is arranged to archive the tape cartridge magazines 113, or independent tape cartridges 120, within the library 107. A tape drive facilitates data storage operations (such as, reading and writing) to and from a tape cartridge 120. In the present depicted embodiment, the tape drives 130 stored data with more or less a direct line to the archive storage controller 101. Here, tape cartridges 120 are transported to the drives 130 via a robotic transporter 124. A robotic transporter 124 in one embodiment is a robotic device that moves along a rail system via a belt device, a motorized rack and pinion arrangement, a lead screw arrangement, a motor with wheels, etc. The tape cartridge 120 can be loaded into or removed from a tape drive 130 via a picker device 122 that is carried by the robotic transport 124, for example. The cooperating relationship between a tape cartridge 120 and a tape drive 130 is one that facilitates data storage operations, such as reading and writing data to and from the cooperating tape cartridge 120. In an optional embodiment, the tape cartridges 120 may be associated with different users of data, which can occur when the storage resources in the library 107 are divided into two or more partitions wherein each partition is associated with the different user of data, for example. The position ready to transfer the tape cartridge 120 into a tape drive from a magazine 113 is a location that facilitates a tape cartridge 120 to be inserted in one of the drives 130A or 130B, such as tape cartridge 120A shown in a cooperating relationship with the first tape drive 130A. In the present embodiment, the position ready to transfer the tape cartridge 120 into a tape drive from a magazine 113 does not require further movement via the robotic transporter 124, rather the picker device 124 moves a cartridge 120 from the magazine 113 to a drive 130.

The library 107 also optionally comprises an entry/exit port 110 whereby tape cartridges 120 or tape cartridge magazine 113 comprising a plurality of tape cartridges 120 can be transferred between an environment external to the library 107 and an environment internal to the library 107. In this embodiment, the library 107 comprises a graphical user interface 132 and an auxiliary memory 134, such as one or more disk drives, solid state memory or other non-volatile memory device/s capable of retaining (storing) relevant information, such as mapping address information of each tape cartridge 120, for example. The library 107 further possesses a computer or Central Processing Unit (CPU) 136 that houses at least on macro controller that actively cooperates with algorithms to orchestrate actions to components within the library 107, for example, over a Computer Area Network (CAN), not shown. The library 107 possesses a controller/map system 108, which can optionally be functionally included with the CPU 136. The controller/map system 108 maintains the addresses of the components mapped out for the server 102 (i.e., tape slot addresses, drive addresses, robot addresses, etc.) to direct operations within the library 107. FIG. 1 is illustrative of basic components used to exemplify inventive embodiments disclosed herein. As one skilled in the art will appreciate, a data storage library will generally include devices and structures not shown in the block illustration of FIG. 1, such as additional controllers (e.g., those controlling other components in the library including the robotic transporter 124), wiring, cooling systems, switch systems, lighting, protocol bridges, etc.

The server 102, or host computer, may be desirous to store data to an archive storage system 111 without knowledge of the tape library 100. In the depicted embodiment, the server 102 transmits data 104 to the archive storage system 111 for storage. The archive storage controller 101 essentially caches data from the server in the archive storage cache 109 and controls the tape library 100 to load tapes into one of the tape drives 130 and store data to one or more of the tape cartridges 120. Here, the tape library 100 is "behind" the archive storage system 111 and is capable of storing far more data than can be stored in the archive storage system 111 alone.

FIG. 2 illustratively depicts a simplified diagram of the tape library 107 and the components that can be used as exemplary elements for embodiments described herein. As shown, some of the basic components in the library 107 include a tape drive 130 and a set of related tape cartridges A-P 162-170. With more specificity, tape cartridge-A 162 is depicted in a cooperating relationship with the tape drive 130. The archive storage cache 109 can comprise a plurality of magnetic hard disc drives 172. The set of related tape cartridges A-P 162-170 may contain related data for specific server 102, a specific customer, a specific timeframe, a particular subject matter, and the like.

Exemplary embodiments below essentially describe a first tape cartridge adapted to retain first data and first metadata, a second tape cartridge adapted to retain second data and second metadata, a random access storage memory 172, such as a hard disk drive, retaining a parity of the first data and the second data along with the first metadata and second metadata, wherein the parity data on the random access storage memory 172 is transferred to a parity tape 170. The parity tape 170 can be used to reconstruct any data lost from either the first tape cartridge or the second tape cartridge.

Figure 3:
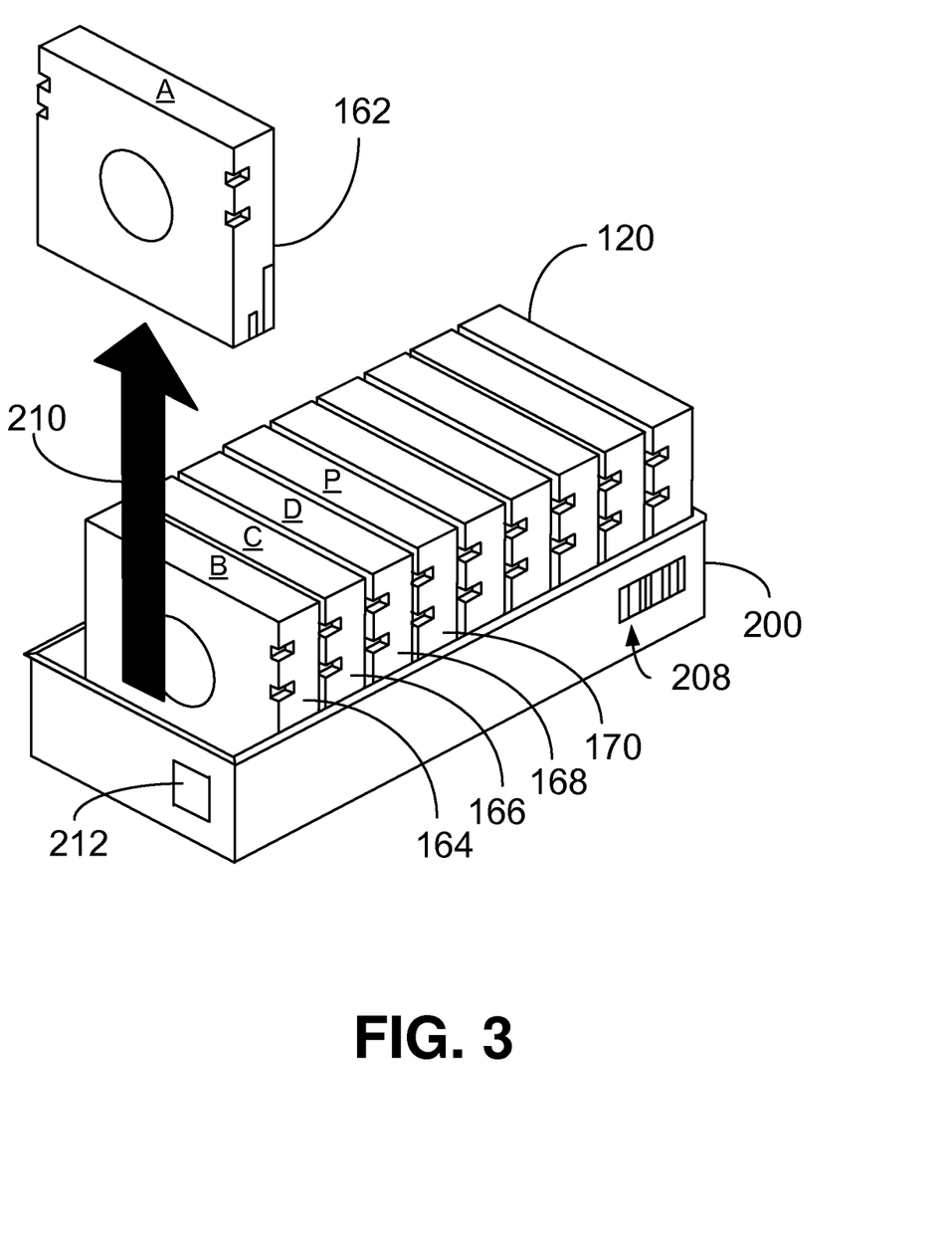
FIG. 3 illustratively depicts tape cartridges supported by a tape cartridge magazine constructed in accordance with certain embodiments of the present invention.

With reference to FIG. 3, shown therein are tape cartridges 120 supported by a tape cartridge magazine 200. In more detail, a tape cartridge 120, such as an LTO-6 category tape cartridge, comprises magnetic tape that is capable of storing digital data written by a compatible drive 130, such as an LTO-6 tape drive manufactured by IBM of Armonk, N.Y., when in cooperation to read and write data (i.e., loaded) with the tape cartridge 120, as shown in FIGS. 1 and 2. The tape cartridge magazine 200 is illustratively shown populated with a plurality of tape cartridges 120. A tape cartridge 120 can be removed from the tape cartridge magazine 200, as shown by the arrow 210, and inserted into a tape drive 130 by means of a picker device (not shown). Disposed on the tape cartridge magazine 200 is a bar code identifier 208 for identifying the tape cartridge magazine 200, which has utility should the tape cartridge magazine 200 be archived in a media pack storage vault that is remote from a library (i.e., not in a library), for example. In some embodiments, all tape cartridges 120 contain a Medium Auxiliary Memory (MAM) device (not shown), however, in alternative embodiments, some tape cartridges may not contain a MAM device. One example of a MAM device is a flash memory device that is activated by radio frequency. In other embodiments of the present invention, the magazine 200 can comprise a magazine auxiliary memory device (not shown) that is capable of containing information (such as tape slot address mapping information, e.g., a tape cartridge corresponding to "slot-1" can retain the identity of "slot-1" on the tape cartridge's MAM) from at least one of the data cartridges 120 disposed in the magazine 200. The magazine auxiliary memory device 212 can receive information that is maintained on the tape cartridge MAM devices contained via one or more MAM device readers/writers associated with a tape drive 130, or some reader not associated with a tape drive 130, for example. Information from the MAM devices can be read and immediately transmitted to the magazine auxiliary memory device 212, or alternatively, the information of each MAM device can be stored on the auxiliary storage device 134 and then transferred to the magazine auxiliary memory device 212, just to name two examples. The magazine 200 provides an adequate environment to hold a set of protected tape cartridges 120.

One embodiment of a set of protected tape cartridges 120 can include ten tape cartridges whereby eight of the tape cartridges include user data and two tape cartridges can include parity data, such as P and Q parity. P+Q redundancy uses two orthogonal parity functions to protect against up to two tape failures or losses. To illustrate the process, when data blocks A1 and A2 are stored, the random-access storage devices store a copy of the data blocks, thus:

$$PA1=A1, PA2=A2$$

$$QA1=A1, QA2=A2$$

When blocks B1 and B2 are stored later, the parity functions are used to calculate the new values for P and Q:

$$PB1=P(PA1,B1), PB2=P(PA2,B2)$$

$$QB1=Q(QA1,B1), QB2=Q(QA2,B2)$$

These new values replace the prior values. When blocks C1 and C2 are stored later, the parity functions use the previous parity values and the new blocks to calculate:

$$PC1=P(PB1,C1), PC2=P(PB2,C2)$$

$QC1=Q(QB1,C1), QC2=Q(QB2,C2)$ and so on. Once blocks have been stored to all eight tape cartridges, the archive storage system 111 may transfer a copy of the P parity blocks from the random-access storage device to the ninth tape cartridge, and the Q parity blocks to the tenth tape cartridge, thus making the protected tape cartridges 120 a complete set, capable of surviving the failure or loss of any two cartridges.

Figure 4:
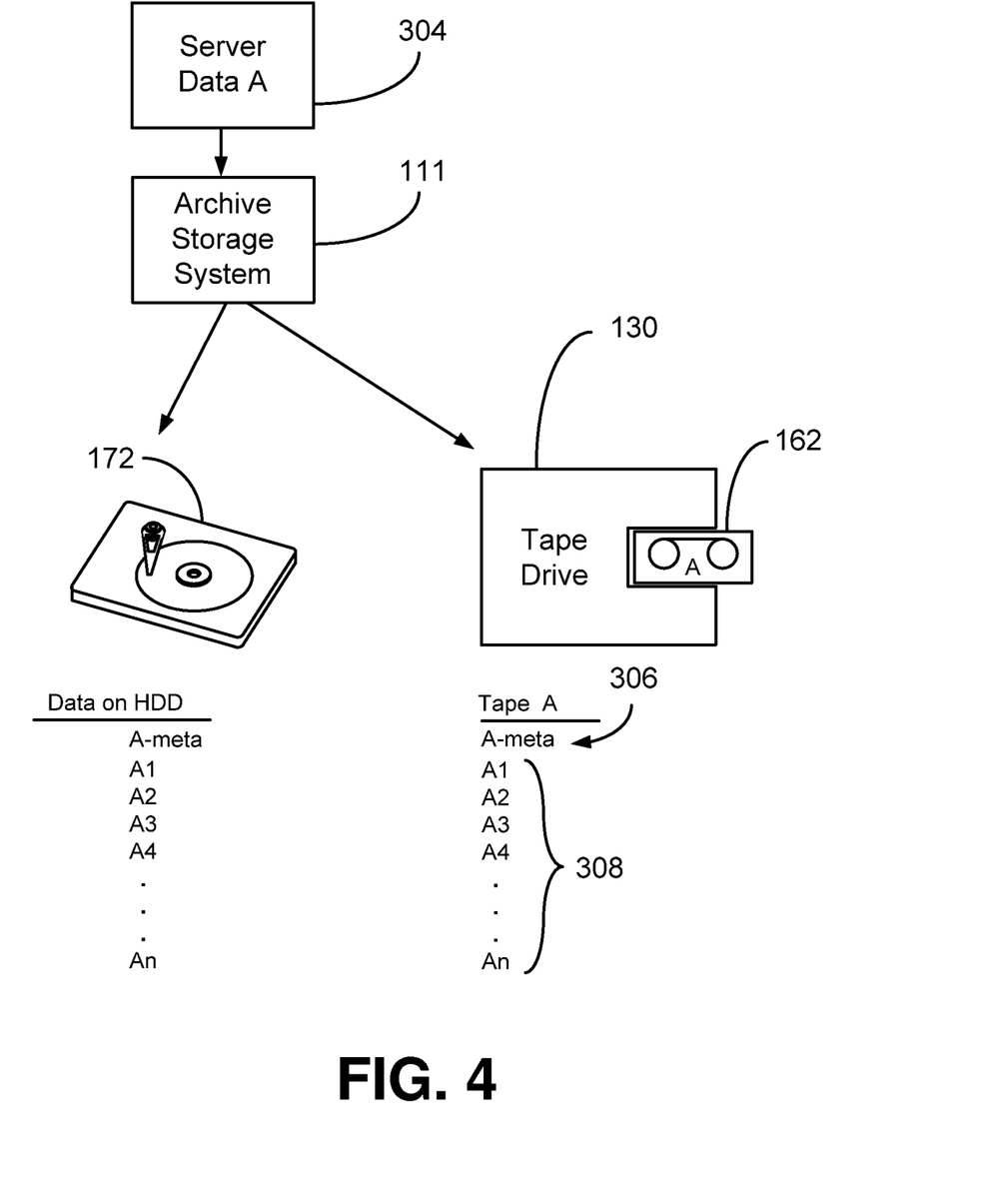
FIG. 4 illustratively depicts data-A stored to both a hard disk drive and to tape cartridge A constructed in accordance with certain embodiments of the present invention.

FIGS. 4-9 depict an exemplary RAIT-5 parity layout consistent with embodiments of the present invention, and is used herein for illustrative purposes only. Other layouts consistent with embodiments of the present invention can include RAIT-6 parity, for example, as discussed above with P and Q. FIG. 4 illustratively depicts data-A 306 stored to both a hard disk drive 172 and to tape cartridge A 162 consistent with the basic structural layout embodiments of FIG. 2. The present embodiment contemplates data-A 306 being stored to tape cartridge A 162 and index information, or metadata (A-meta 306), about data-A 306 being stored to an index partition. As illustratively depicted, data-A 306 is stored to both the hard disk drive 172 and two tape cartridge A 162 via the tape drive 130. For convenience here, data-A 306 is arranged by bits A1-An 308. Though the random access memory 172 is considered to be part of the archive storage system 111, certain embodiments contemplate one or more random access memory devices 172 being located in the tape library 107 while functioning within the scope and spirit of the described embodiments herein.

Figure 5:
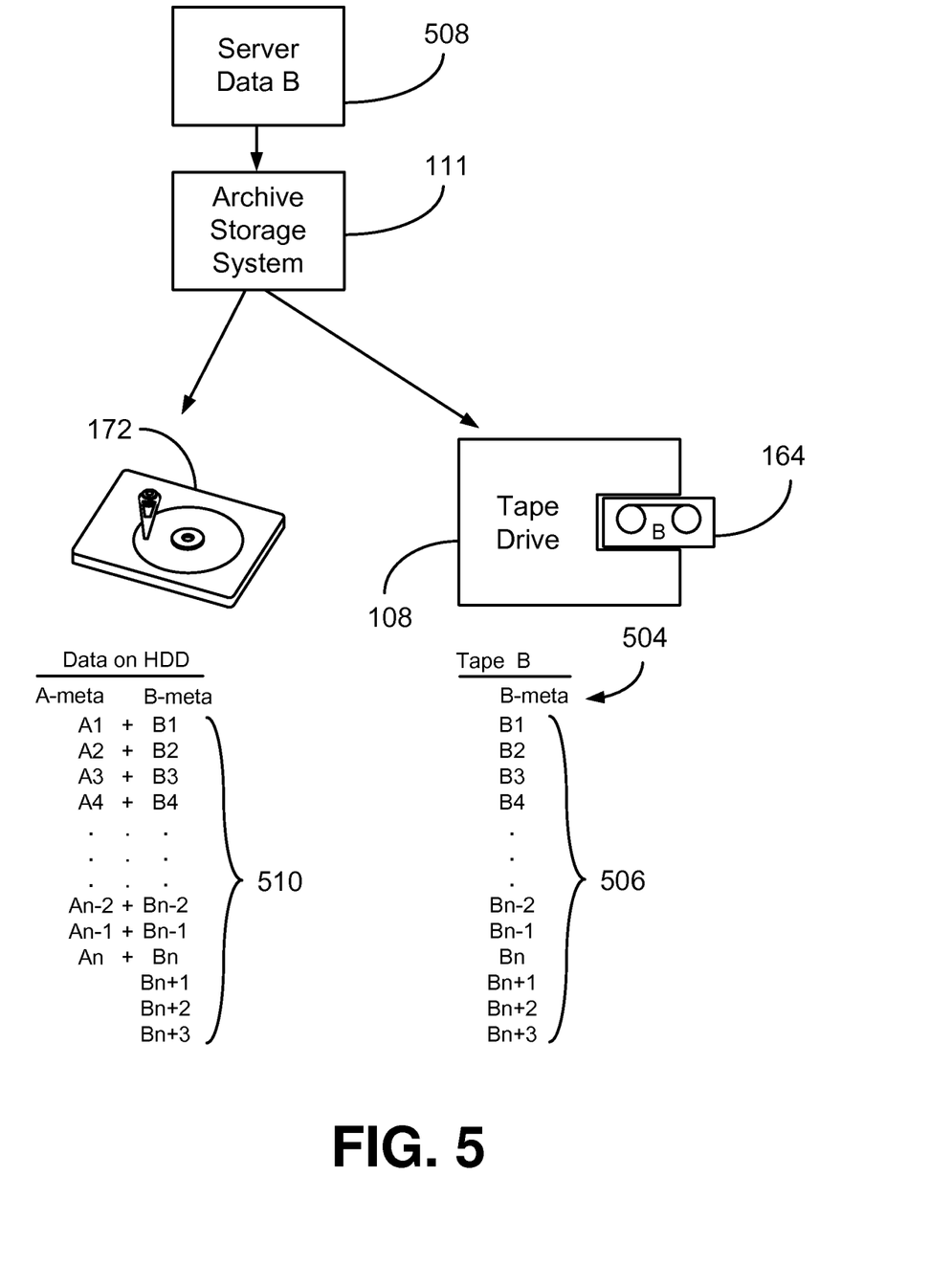
FIG. 5 illustratively depicts data-B stored to both a hard disk drive and to tape cartridge B constructed in accordance with certain embodiments of the present invention.

FIG. 5 illustratively depicts the arrangement of FIG. 4 now receiving data-B 506 from data server B 508 consistent with embodiments of the present invention. As shown, data-B 506 is stored to both the hard disk drive 172 and to tape cartridge B 164. The present embodiment contemplates data-B 506 being stored to tape cartridge B 164 along with index information being stored to an index partition of tape cartridge B 164. In the present embodiment, B-metadata 504 is stored in conjunction with data-B 506 on the hard disk drive 172 along with the A-metadata 306. Other embodiments contemplate B-metadata 504 and A-metadata 306 associated with data-B 506 stored to the hard disk drive 172. Yet another embodiment contemplates parity data of B-metadata 504 plus A-metadata 306 as the metadata portion on the hard disk drive 172. As illustratively depicted, data bits A1-An 308 and data bits B1-Bn+3 506 are passed to one or more parity functions to create a redundant data stripe of data-A 308 and data-B 506 on the hard disk drive 172. Certain embodiments contemplate tape cartridge B 164 being capable of saving more data thereon than tape cartridge A 162. Certain embodiments contemplated provide data-A 308 stored in memory, then when data-B 506 comes along a parity function is applied with data-A 308. The parity result of data-B 506 and data-A 308 are stored to the hard disk drive 172, and data-A 308 is removed. Certain other embodiments contemplate backfilling missing data bits An+1, An+2, An+3 with zeros, for example.

Figure 6:
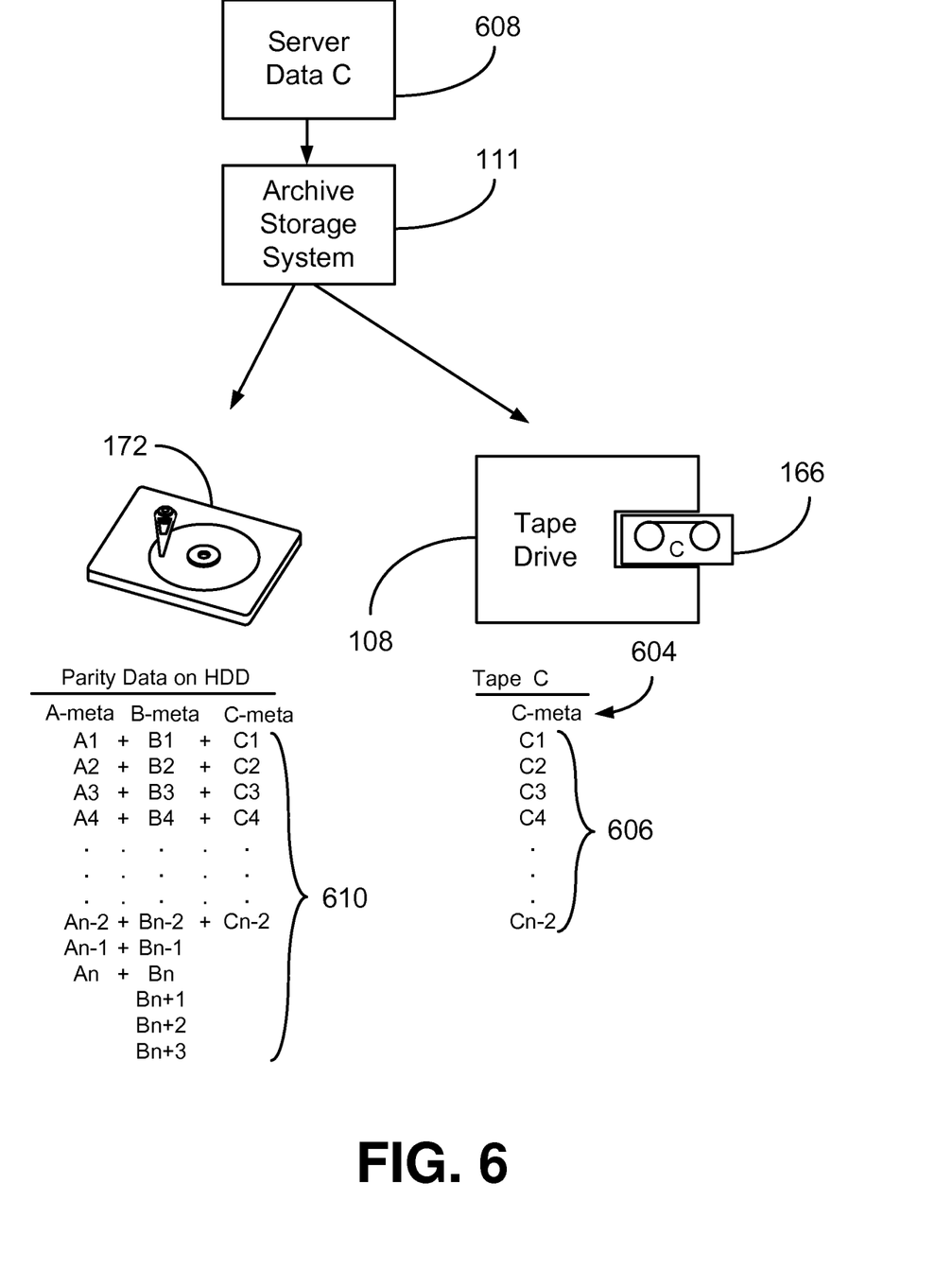
FIG. 6 illustratively depicts data-C stored to both a hard disk drive and to tape cartridge C constructed in accordance with certain embodiments of the present invention.

FIG. 6 illustratively depicts the arrangement of FIG. 5 now receiving data-C 606 from data server C 608 consistent with embodiments of the present invention. As shown, data-C 606 is stored to both the hard disk drive 172 and to tape cartridge C 166. The present embodiment contemplates data-C 606 being stored to tape cartridge C 166 along with index information being stored to an index partition of tape cartridge C 166. In the present embodiment, C-metadata 604 is stored in conjunction with data-C 606 on the hard disk drive 172 along with the A-metadata 306 and B-metadata 504. Other embodiments contemplate B-metadata 504, A-metadata 306 and C-metadata 604 associated with data-C 606 stored to the hard disk drive 172. Yet another embodiment contemplates parity data of B-metadata 504 plus A-metadata 306 plus C-metadata 604 as the metadata portion on the hard disk drive 172. As illustratively depicted, parity data bits A1-An plus B1-Bn+3 are added with C1-Cn−2 610 to create a redundant data stripe of data-A 308 and data-B 506 and data-C 606 on the hard disk drive 172. Certain embodiments contemplated provide the parity of data-A 308 and data-B 506 (parity data-A, data-B) passed through a parity function with data-C 606 whereby the parity result of data-B 506 and data-A 308 and data-C 606 are stored to the hard disk drive 172, and the parity of data-A 308 and data-B 506 is removed. In other words, the parity of data-A and data-B is passed through a parity function with data-C 606 to form parity of data-A, data-B, and data-C. Certain other embodiments contemplate backfilling missing data bits Cn−1, Cn, Cn+1, Cn+2, Cn+3 with zeros, for example.

Figure 7:
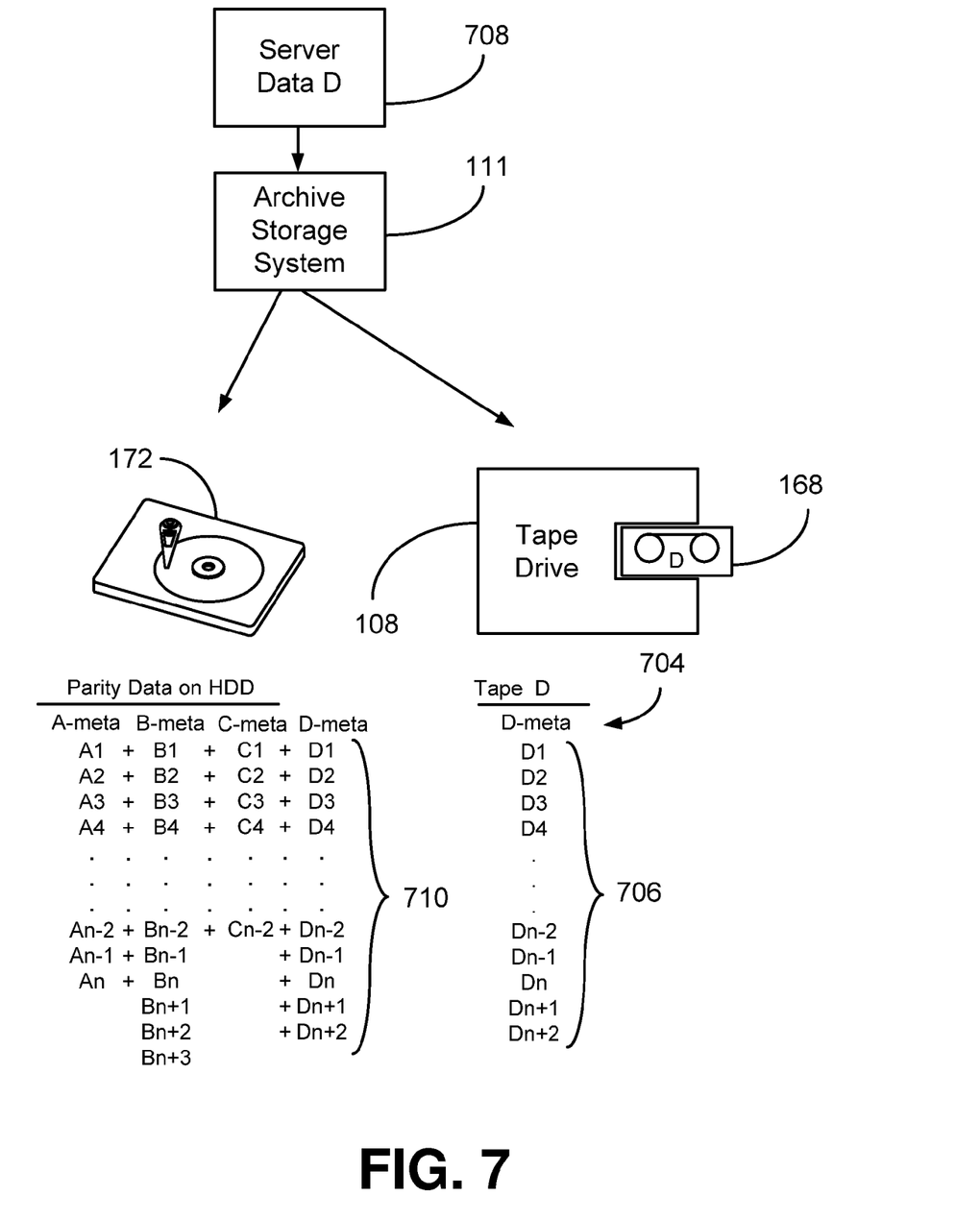
FIG. 7 illustratively depicts data-D stored to both a hard disk drive and to tape cartridge D constructed in accordance with certain embodiments of the present invention.

FIG. 7 illustratively depicts the arrangement of FIG. 6 now receiving data-D 706 from data server D 708 consistent with embodiments of the present invention. As shown, data-D 706 is stored to both the hard disk drive 172 and to tape cartridge D 168. The present embodiment contemplates data-D 706 being stored to tape cartridge D 168 along with index information being stored to an index partition of tape cartridge D 168. In the present embodiment, D-metadata 704 is stored in conjunction with data-D 706 on the hard disk drive 172 along with the A-metadata 306, B-metadata 504 and C-metadata 604. Other embodiments contemplate A-metadata 306, B-metadata 504, C-metadata 604, and D-metadata 704 associated with data-D 706 stored to the hard disk drive 172. Yet another embodiment contemplates parity data of A-metadata 306 plus B-metadata 504 plus C-metadata 604 plus D-metadata 704 as the metadata portion on the hard disk drive 172. As illustratively depicted, parity data bits A1-An plus B1-Bn+3 plus C1-Cn−2 are added with D1-Dn+2 710 to create a redundant data stripe of data-A 308 and data-B 506 and data-C 606 and data-D 706 on the hard disk drive 172. Certain embodiments contemplate tape cartridge A 162, tape cartridge B 164, tape cartridge C 166, and tape cartridge D 168 each possessing different storage capacities (e.g., tape cartridge C 166 having greater storage capacity than tape cartridge A 162. Yet other embodiments contemplate all of the tape cartridges possessing the same storage capacity but retaining different amounts of data thereon. Embodiments where all the tape cartridges possess the same storage capacity yet have different amounts of data stored thereon can be backfilled with zeros to create the parity data from data strings that all have the same length (i.e., number of bits). Yet other embodiments contemplate some tape cartridges possessing different storage capacities and other tape cartridges simply retaining different amounts of data thereon. Certain embodiments contemplate adding zeros at the end of each data string in the parity data to align all data bits to compensate for tape cartridges with different capacities, tape cartridges retaining different amounts of data, or combination thereof for example. Certain embodiments contemplated provide the parity of data-A 308, data-B 506, and data-C 606 passed through a parity function with data-D 706 whereby the parity result of data-B 506, data-A 308, data-C 606 and data-D 706 are stored to the hard disk drive 172, and the parity of data-A 308, data-B 506, and data-C 606 is removed.

Figure 8:
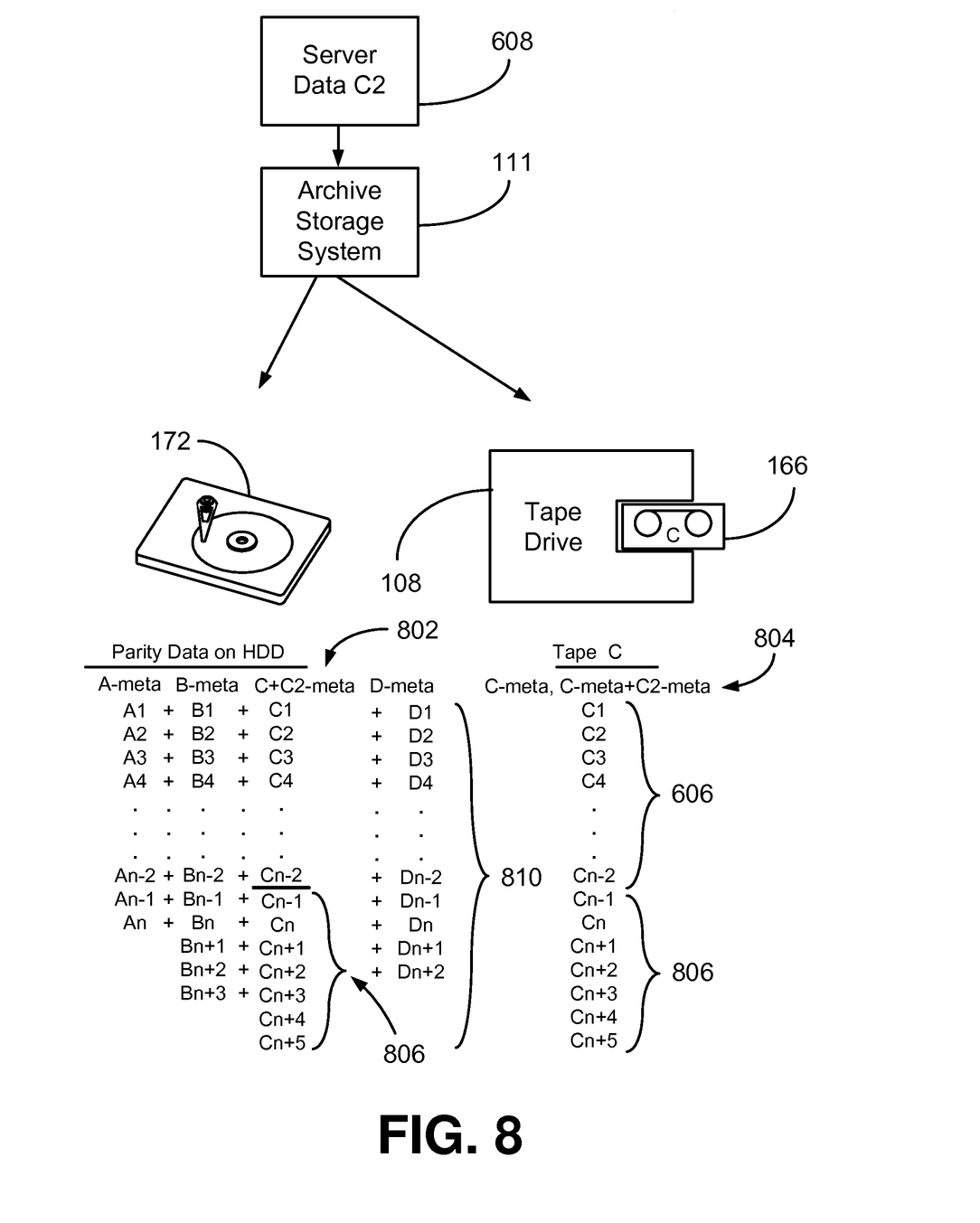
FIG. 8 illustratively depicts additional data-C2 stored to both a hard disk drive and to tape cartridge C constructed in accordance with certain embodiments of the present invention.

FIG. 8 illustratively depicts the arrangement of FIG. 7 now receiving data-C2 806 from data server C 608 consistent with embodiments of the present invention. As shown, data-C2 806 is stored to both the hard disk drive 172 and to tape cartridge C 166, wherein tape cartridge C 166 is yet again loaded into tape drive 108. The present embodiment contemplates data-C2 806 being stored to tape cartridge C 166 along with index information C-meta+C2 meta 804 added to C-meta 604 being stored to an index partition of tape cartridge C 166 consistent with FIG. 4. In the present embodiment, C+C2-metadata 802 is stored in conjunction with data-C 606 and data-C2 806 on the hard disk drive 172 along with the A-metadata 306, B-metadata 504 and D-metadata 704. Other embodiments contemplate A-metadata 306, B-metadata 504, C+C2-metadata 804, and D-metadata 704 stored to the hard disk drive 172. Yet another embodiment contemplates parity data of A-metadata 306 plus B-metadata 504 plus C+C2-metadata 804 plus D-metadata 704 as the metadata portion on the hard disk drive 172. As illustratively depicted, parity data bits A1-An plus B1-Bn+3 plus C1-Cn−2 plus D1-Dn+2 are added with Cn−1-Cn+5 810 to create a redundant data stripe of data-A 308 and data-B 506 and data-C 606 and data-D 706 and data C2 806 on the hard disk drive 172.

Figure 9:
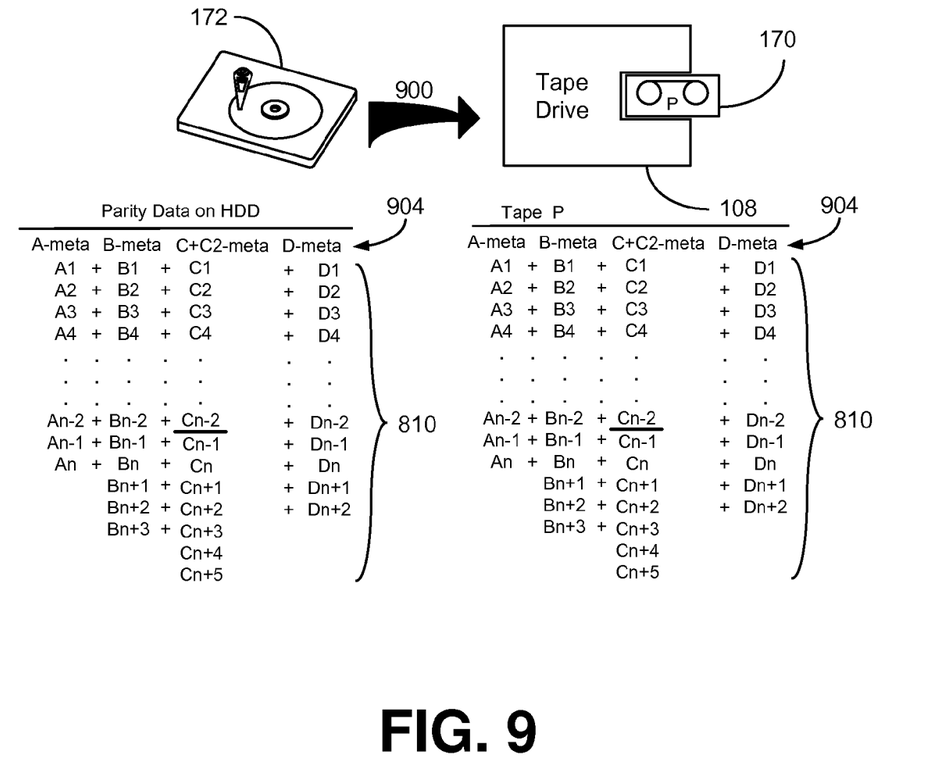
FIG. 9 illustratively depicts parity data retained on a hard disk drive being transferred to a parity tape cartridge P constructed in accordance with certain embodiments of the present invention.

FIG. 9 illustratively depicts the data 810 stored to the hard disk drive of FIG. 8 transferred to the parity tape 170 consistent with embodiments of the present invention. As shown by the arrow 900, all of the metadata 904 and all of the parity data 810 on the hard disk drive are transferred to the parity tape 170. In this way, parity tape 170 can accompany the set of tapes A 162 through D 168 to provide a redundant copy of the data in the form of parity data in the data set 162-168 if any one of the cartridges in the data set 162-168 becomes lost, damaged, corrupted, etc. The parity data 810 on the hard disk drive 172 can then be erased, or rewritten, to accommodate new data for a new tape set. One embodiment contemplates the metadata 904 to be retained permanently or for a prolonged period of time on the hard disk drive 172. Yet other embodiments contemplate both the parity data 810 and the metadata 904 to be erased or rewritten, to accommodate new data for new tape set.

Certain embodiments of the present invention are contemplated to include parity data of data stored on the tape cartridges 162-168 retained on the disk drive 172 and not stored to a parity tape 170. Other embodiments contemplate retaining parity data of data stored on the tape cartridges 162-168 retained on both the disk drive 172 and on a parity tape 170. Yet other embodiments contemplate deleting the parity data from the disk drive 172 and preserving the parity data on the parity tape cartridge 170. Yet other embodiments contemplate creating multiple kinds of parity, such as RAID level 5 and RAID level 6, on the disk drive 172 together either at the same time or at different times in order to preserve a more adequate redundancy approach if the individual data sets become large, for example.

FIG. 4 through FIG. 9 illustratively depicts embodiments where one tape drive 130 serially stores data on tape cartridges 162-170. However, embodiments of the present invention contemplate parity data capable of being stored to a random access memory device, such as the disk drive 172, being done independently of the manner in which tape cartridges are mounted (i.e., loaded in storing data) via a tape drive, whether on the fly or not. On the fly is envisioned herein to mean building parity of the multiple data sets while each data set is being stored to a tape cartridge. For example, some embodiments contemplate multiple tape drives storing multiple data sets on multiple tape cartridges in parallel while building the parity of the multiple data on the fly. Other embodiments contemplate multiple tape drives storing multiple tape sets to multiple tape cartridges at staggered times (not requiring parallel writing). For example, a first tape drive storing first data to a first tape cartridge and a short time later a second tape drive storing second data to a second tape cartridge while the first tape drive is storing the first data to the first tape cartridge. In this embodiment, the first tape cartridge may be loaded before the second tape cartridge in their respective tape drives. One or more disk drives are then envisioned to construct parity from the first data and the second data on the fly, essentially while the second data is being received by the one or more disk drives. Certain embodiments contemplate the first data being written first would be replaced by the parity of the first plus the second data while the second data is coming in. Another embodiment contemplates storing the first data in its entirety and the second data in its entirety on the disk drive and then building parity of the first data and the second data and then deleting the first data and the second data. Given these examples as a roadmap, a skilled artisan will be able to envision optional methods to assemble a desired parity level (RAID level) to the disk drive from the first data and the second data.

Figure 10:
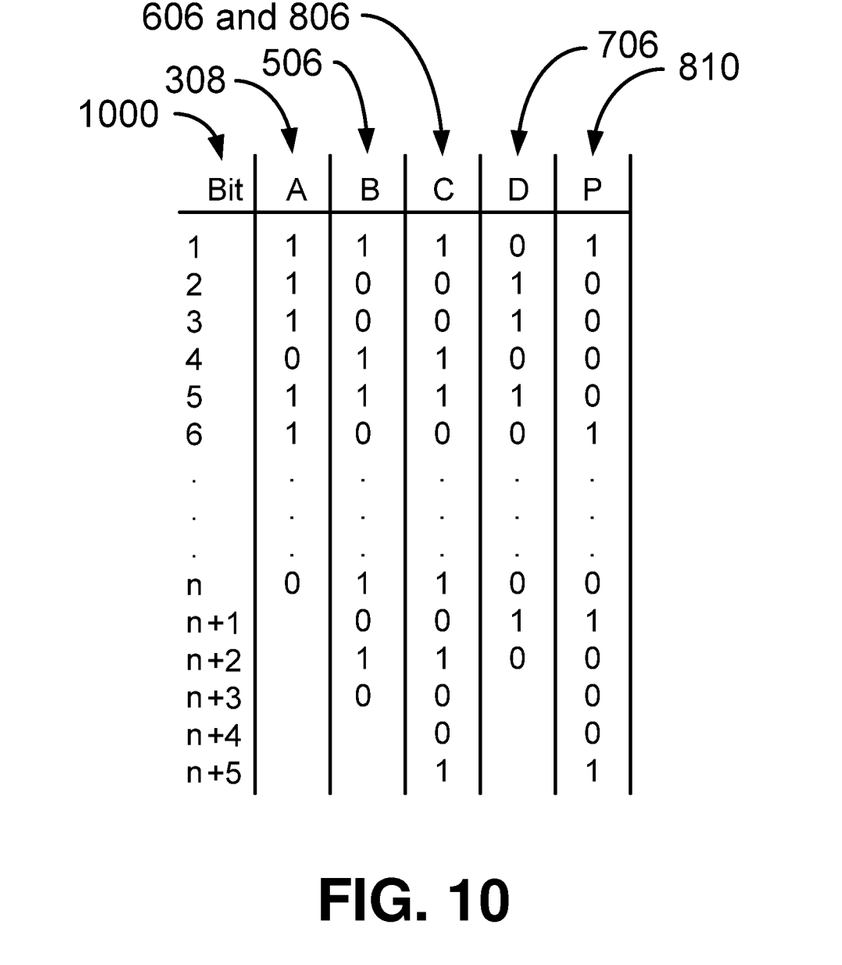
FIG. 10 illustratively depicts an example of data bits of multiple data sets aligned with parity data bits constructed in accordance with certain embodiments of the present invention.

In the examples described in conjunction with FIG. 4 through FIG. 9, the parity tape 170 can be used to reconstruct any one of the tape cartridges in the data thereon is lost or otherwise unreadable. For example, if tapes cartridge C 166 becomes unreadable then the data (and more specifically the data bits) from tape cartridge A 162, tape cartridge B 164, tape cartridge D 168, and the parity tape cartridge 170 can be combined to resolve tape cartridge C 166. FIG. 10 illustratively depicts an example of data bits 1 through n+5 1000 aligned with the data bits from data-A 308, data-B 506, data-C 606 and 806, data-D 706, and parity data 810. For example, if the data on tape cartridge C 166 were not accessible then the data from tape cartridge A 162, tape cartridge B 164, tape cartridge D 168, and the parity tape cartridge 170 can be loaded to the hard disk drive 172 or other non-transitory data storage memory, such as the hard disk drive 172, and tape cartridge C 166 can be reconstructed. More specifically, with regards to the first bit: A1=1, B1=1, D1=0, and P1=1 therefore C1 must equal 1. With regards to the second bit: A2=1, B2=0, D2=1, and P2=0 therefore C2 must equal 0. With regards to the fifth bit: A5=1, B5=1, D5=1, and P5=0 therefore C5 must equal 1. This logic is continued for all data bits to n+5 using the data from the examples of FIGS. 3-10.

Embodiments of FIGS. 4-10 are not limited to one parity tape cartridge for the parity data 810. For example, embodiments contemplate more than one tape cartridge being required to store parity data if the parity data exceeds the capacity of a tape cartridge. Also, server data A 304 and server data B 508 may originate from the same server or different server/s, however data A 304 and data B 508 are stored to a common set of tape cartridges, such as to accommodate a virtual "bucket" or "container".

Figure 11:
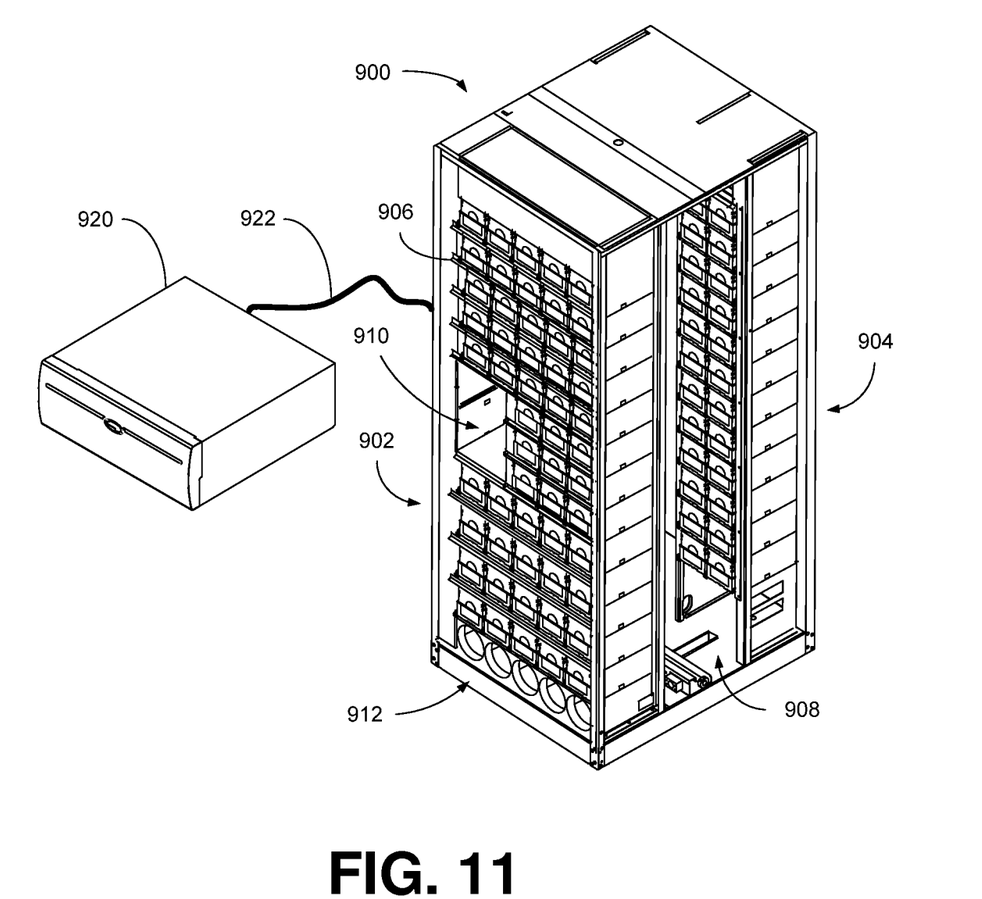
FIG. 11 illustratively depicts an example of a commercial embodiment of a library where embodiments of the present invention can be practiced.

Embodiments of the present invention can be commercially practiced in a Black Pearl archive storage system that possesses a Spectra Logic T-Finity tape cartridge library on the backend manufactured by Spectra Logic of Boulder Colo. FIG. 11 shows a commercial embodiment of one Black Pearl archive storage system 920 communicatively linked with the T-Finity unit 900 via a cable 922. The T-Finity unit 900 is shown Without an enclosure, whereby the T-Finity unit 900 is a single cabinet whereby multiple cabinets can be combined to make an expandable library. The Black Pearl archive storage system 920 possesses archive storage controller (not shown) and a plurality of hard disk drives (not shown) and software that facilitates receiving data from a server (not shown), caching that data in at least one of the plurality of hard disk drives, and storing that data to tape cartridges in the T-Finity library 900. The Black Pearl archive storage system 920 is capable of handling all tape related storage commands without the server's involvement. The T-Finity unit 900 comprises a first and second shelf system 902 and 904 that are adapted to support a plurality of the mobile media, such as tape cartridge magazines 906 comprising a plurality of LTO-6 tape cartridges, archived in the library 900. The second shelf system 904 comprises at least one tape drive (not shown) adapted to read and write data to and from a tape cartridge. Functionally interposed between the first and second shelf system 902 and 904 is a magazine transport space 908. The magazine transport space 908 is adapted to provide adequate space for a tape cartridge magazine 906 to be moved, via a magazine transport (not shown) and cartridge picker device (not shown), from a position in the first shelf system 902, for example, to/near a drive. Tape cartridge magazines 906 can be transferred into and out from the T-Finity library via an entry/exit port 910. Transferring tape cartridge magazines 906 in and out of the T-Finity library can be accomplished by an operator, for example. The T-Finity library comprises a means for cooling as shown by the fans 912, located at the base of the unit 900.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, more than one hard disk drive 110 can be used in conjunction with a tape drive 108, or more than one tape drive, to efficiently store redundant data within a library assembly while still maintaining substantially the same functionality without departing from the scope and spirit of the present invention. Another example can include using these techniques with different kinds of random access memory devices, such as solid state drives, or other, or a combination of hard disk drives, solid state drives, and other kinds of random access memory devices while still maintaining substantially the same functionality without departing from the scope and spirit of the present invention. Further, though communication is described herein as between a client and an archive storage controller that passes data to a data storage library, such as the library 107, communication can be received directly by addressable components, such as the tape drive 130, via and interface device to the library 107 possessing random storage access devices, for example, without departing from the scope and spirit of the present invention. Further, for purposes of illustration, a first and second tape drive and first and second tape cartridges are used herein to simplify the description for a plurality of (many) tape drives and tape cartridges. Moreover, elements described herein as a first element (cartridge or drive for example) and second element is descriptive to mean a plurality of elements. Additionally, though there are five tapes cartridges including a parity tape cartridge used herein for example, it is contemplated that a variety of different numbers of tape cartridges can comprise a tape set and a variety of other data striping techniques can be used with a set of tape cartridges and random access storage memory device without departing from the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method comprising:
providing a data storage system with a data storage medium, a second data storage medium, a parity data storage medium, a first data transfer device, and a dedicated random storage access memory device;
loading the first data storage medium into the first data transfer device;
storing first data and first metadata corresponding to the first data to the first data storage medium via the first data transfer device;
storing the first data to the dedicated random storage access memory device;
disengaging the first data storage medium from the first data transfer device;
loading the second data storage medium into the first data transfer device;
storing second data and second metadata corresponding to the second data to the second data storage medium via the first data transfer device;
after said storing first data step, generating parity data of the first data and the second data to the dedicated random access memory device.

2. The method of claim 1 further providing a third data storage medium and a second data transfer device; loading the third data storage medium into the second data transfer device before loading the second data storage medium into the first data transfer device and while the first data storage medium is loaded in the first data transfer device; storing the third data and third metadata corresponding to the third data to the third data storage medium via the second data transfer device; storing first-third parity data of the first data and the third data to the dedicated random access memory device, wherein the first-third parity data replaces any of the first data retained in the random storage access memory device.

3. The method of claim 1 further comprising disengaging the second data storage medium from the first data transfer device; loading the parity data storage medium into the first data transfer device; and transferring the parity data from the dedicated random access memory device to the parity data storage medium.

4. The method of claim 3 further comprising deleting the parity data from the random access storage memory device.

5. The method of claim 1 wherein storing the first data and the first metadata to the first data storage medium and storing the first data and the first metadata to the dedicated random storage access memory device are done coincidentally.

6. The method of claim 1 wherein the first data is overwritten with the parity data on the dedicated random access memory device.

7. The method of claim 1 further comprising storing the first metadata and the second metadata to the dedicated random access memory device.

8. The method of claim 7 further comprising transferring the first metadata and the second metadata from the dedicated random access memory device to the parity data storage medium.

9. The method of claim 1 further comprising reconstructing the second data from the first data retained on the first data storage medium and the parity data from the parity data storage medium.

10. The method of claim 1 wherein the parity data is consistent with mathematics from a group consisting of RAID level 5 and RAID level 6.

11. A method for constructing parity in a tape cartridge set, the method comprising:
   providing a tape library with a plurality of tape cartridges including cartridge-x and cartridge-y, a first tape drive, a second tape drive, and dedicated random access storage capability;
   loading the cartridge-x into the first tape drive;
   storing a sequence of x-bits to cartridge-x via the first tape drive;
   storing a coinciding sequence of the x-bits to the dedicated random storage access storage capability while storing the sequence of x-bits to cartridge-x;
   disengaging the cartridge-x from the first tape drive;
   disposing the cartridge-x in a holding receptacle;
   loading the cartridge-y into the second tape drive before disengaging the cartridge-x from the first tape drive;
   storing a sequence of y-bits to cartridge-y via the second tape drive before the x-bits are finished being stored to the cartridge-x;
   overwriting the sequence of the x-bits to the dedicated random storage access storage capability with a parity of the y-bits and the x-bits to the dedicated random access storage capability, while storing the sequence of y-bits to cartridge-y.

12. The method of claim 11 wherein the parity is generated by aligning the sequence of y-bits and the sequence of x-bits.

13. The method of claim 11 wherein the dedicated random access storage capability further possesses X-metadata corresponding to the sequence of x-bits and Y-metadata corresponding to the sequence of y-bits.

14. The method of claim 13 wherein the X-metadata and the Y-metadata are retained on the random access storage capability after the parity is no longer retained on the dedicated random access storage capability.

15. The method of claim 14 wherein the plurality of tape cartridges comprise a set of tape cartridges that include the cartridge-x and the cartridge-y, the set includes the parity tape cartridge and a second parity tape cartridge capable of repairing lost data from two of the plurality of tape cartridges.

* * * * *